US008204176B2

(12) United States Patent
Garrett

(10) Patent No.: US 8,204,176 B2
(45) Date of Patent: Jun. 19, 2012

(54) SYSTEM FOR INSTRUCTING INDIVIDUALS ON THE DIALING SEQUENCE FOR EMERGENCY NUMBER 911 USING DISTINCTLY COLORED 9 AND 1 BUTTONS

(75) Inventor: Johnna Leah Garrett, Ingleside, IL (US)

(73) Assignee: Johnna Leah Garrett, Ingleside, IL (US)

(*) Notice: Subject to any disclaimer, the term of this patent is extended or adjusted under 35 U.S.C. 154(b) by 924 days.

(21) Appl. No.: 12/221,827

(22) Filed: Aug. 7, 2008

(65) Prior Publication Data

US 2010/0034359 A1 Feb. 11, 2010

(51) Int. Cl.
*H04M 11/04* (2006.01)
*G09F 3/00* (2006.01)
*G09B 19/00* (2006.01)
(52) U.S. Cl. .............................. 379/37; 40/337; 434/112
(58) Field of Classification Search .................. 40/336, 40/337; 434/112; 379/45, 37, 52
See application file for complete search history.

(56) References Cited

U.S. PATENT DOCUMENTS

| 4,255,622 A * | 3/1981 | Reed ............................... 40/337 |
| 4,947,569 A * | 8/1990 | Brooks et al. .................... 40/337 |
| 7,209,730 B2 * | 4/2007 | Montague .................. 455/404.1 |

FOREIGN PATENT DOCUMENTS

KR   1020020020359 A   *   3/2002

* cited by examiner

*Primary Examiner* — Vivian Chin
*Assistant Examiner* — Kile Blair

(57) ABSTRACT

A method in one example has: applying, for a telephone having a plurality of number buttons having at least a nine button and a one button, a first predetermined color to the nine button and a second predetermined color to the one button, the remaining number buttons having a third predetermined color, the first, second, and third predetermined colors being three different colors; and pushing the number buttons in a sequence first predetermined color—second predetermined color—second predetermined color to dial an emergency telephone number. In one embodiment the first predetermined color may be red, and the second predetermined color may be yellow. Therefore, a 911 emergency telephone number may be dialed by pushing the number buttons in the order red-yellow-yellow.

19 Claims, 9 Drawing Sheets

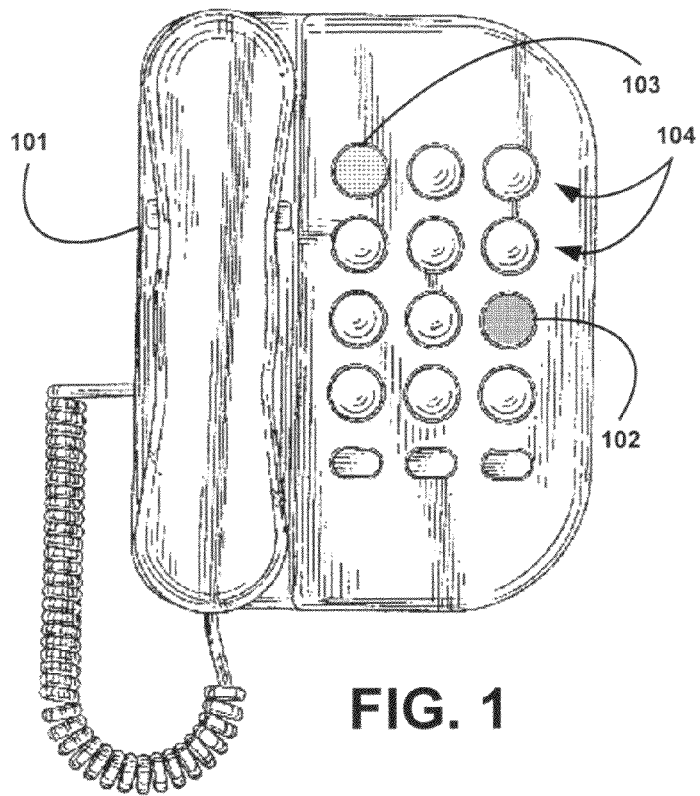
FIG. 1
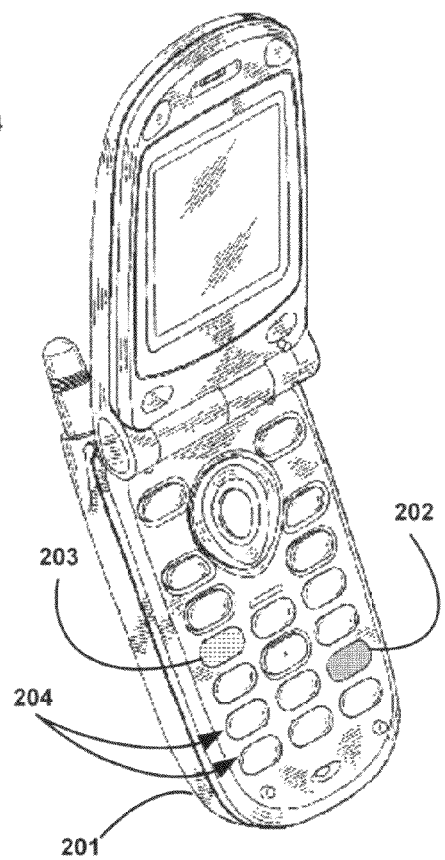
FIG. 2
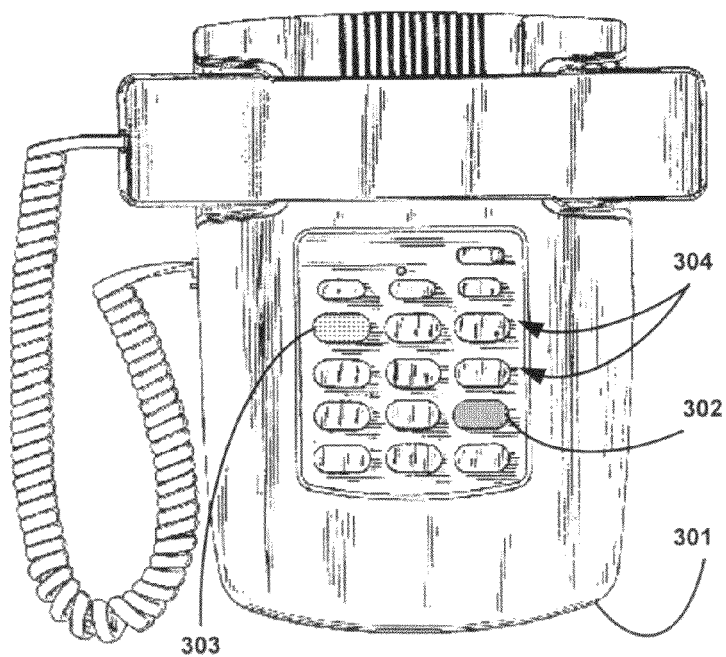
FIG. 3
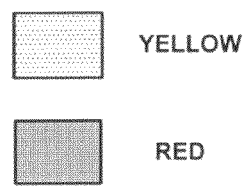

601

701

801

901

1001

1101

1201

1301

1401

RED

1501

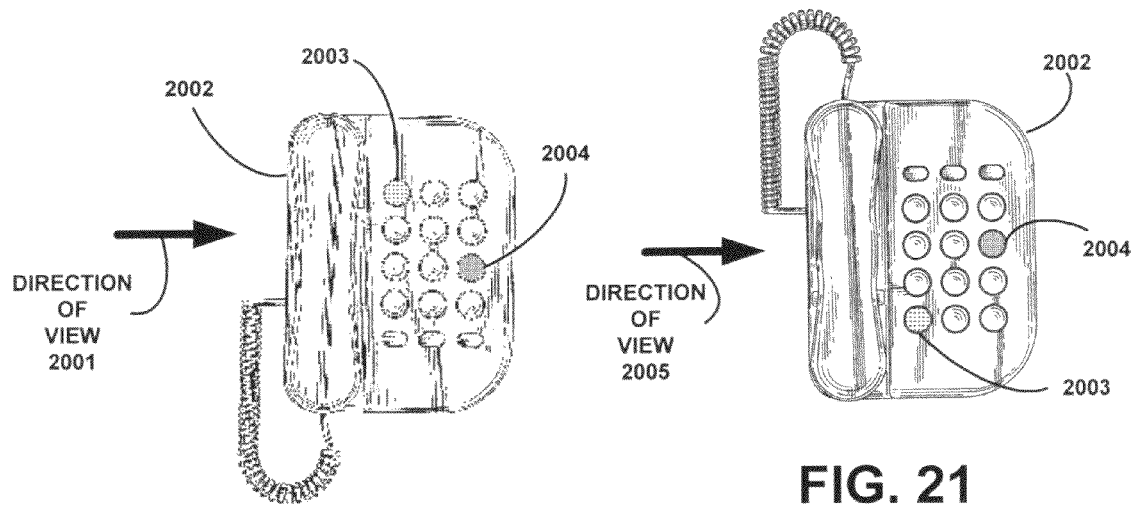
FIG. 20
FIG. 21
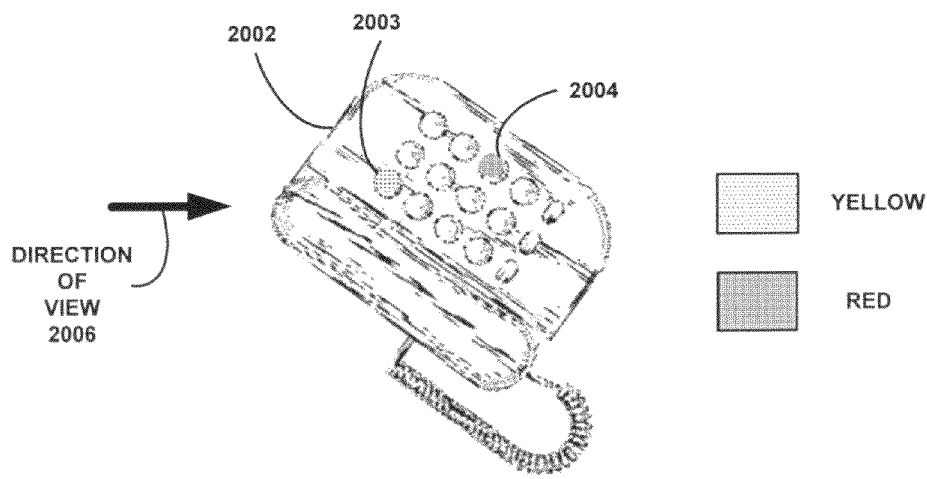
FIG. 22

US 8,204,176 B2

SYSTEM FOR INSTRUCTING INDIVIDUALS ON THE DIALING SEQUENCE FOR EMERGENCY NUMBER 911 USING DISTINCTLY COLORED 9 AND 1 BUTTONS

TECHNICAL FIELD

The invention relates generally to emergency telephone numbers, and more particularly to a means for dialing an emergency number.

BACKGROUND

An N11 code or N11 number is a special abbreviated dialing telephone number within the North American Numbering Plan, which allows access to special services. 911 (usually pronounced "nine-one-one") is the emergency telephone number for the North American Numbering Plan.

In over 98% of locations in the United States and Canada, dialing "911" from any telephone will link the caller to an emergency dispatch center, referred to as a PSAP, or Public Safety Answering Point, which can send emergency responders to the caller's location in an emergency. In most areas (approximately 96% of the US) enhanced 911 is available, which automatically gives dispatch the caller's location, if available.

Enhanced 911 provides emergency responders with the location of the emergency even if the person calling for help does not even speak. This is often useful in times of fires, break-ins, kidnapping, and other events where communicating one's location is difficult or impossible.

However, the one obvious requirement for the system to work is that the 911 emergency telephone number be dialed. Dialing the digits 9-1-1 may be difficult or even impossible for some people, such as small children, elderly people, or persons with physical and/or mental disabilities. Especially in an emergency, these people may lose critical time attempting to dial 911. Unfortunately, many time these people are unable to dial 911.

Therefore, there is a need for an improved method and system for dialing the emergency telephone number 911.

SUMMARY

One implementation encompasses a system. This embodiment of the system may comprise: a telephone having a plurality of number buttons; the plurality of number buttons having at least a nine button and a one button; the nine number button having a first predetermined color; the one number button having a second predetermined color; the two through eight and zero number buttons having a third predetermined color; the first, second, and third predetermined colors being three different colors; and instructions that recite dialing first predetermined color—second predetermined color—second predetermined color.

Another implementation encompasses a method. This embodiment of the method may comprise: applying, for a telephone having a plurality of number buttons having at least a nine button and a one button, a first predetermined color to the nine button and a second predetermined color to the one button, the remaining number buttons having a third predetermined color, the first, second, and third predetermined colors being three different colors; and pushing the number buttons in a sequence first predetermined color—second predetermined color—second predetermined color to dial an emergency telephone number.

A further implementation encompasses a method. This embodiment of the method may comprise: disconnecting a phone from a telecommunication system, the phone having a plurality of number buttons having at least a nine number button and a one number button; cleaning at least an upper surface of at least the nine number button and the one number button, such as an alcohol based cleaner; adhering respective colored stickers on at least an upper surface on at least the nine number button and the one number button, such that the nine button has a first predetermined color and the one button has a second predetermined color, the remaining number buttons having a third predetermined color, the first, second, and third predetermined colors being three different colors; showing the individual the predetermined colors; instructing an individual to push the number buttons in the sequence first predetermined color—second predetermined color—second predetermined color to dial an emergency telephone number in an emergency; demonstrating for the individual the pushing of the number buttons in the sequence first predetermined color—second predetermined color—second predetermined color to summon 911 help; having the individual practice dialing pushing of the number buttons in the sequence first predetermined color—second predetermined color—second predetermined color; and reconnecting the phone to the telecommunication system.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 1 depicts one embodiment of the present method and system for a telephone;

FIG. 2 depicts another embodiment of the present method and system for a telephone;

FIG. 3 depicts a further embodiment of the present method and system for a telephone;

FIGS. 20-22 depict the concept that according to the present method and system the number buttons may be pushed in the sequence first predetermined color—second predetermined color—second predetermined color without regard to any orientation of the telephone.

DETAILED DESCRIPTION

Figure 4:
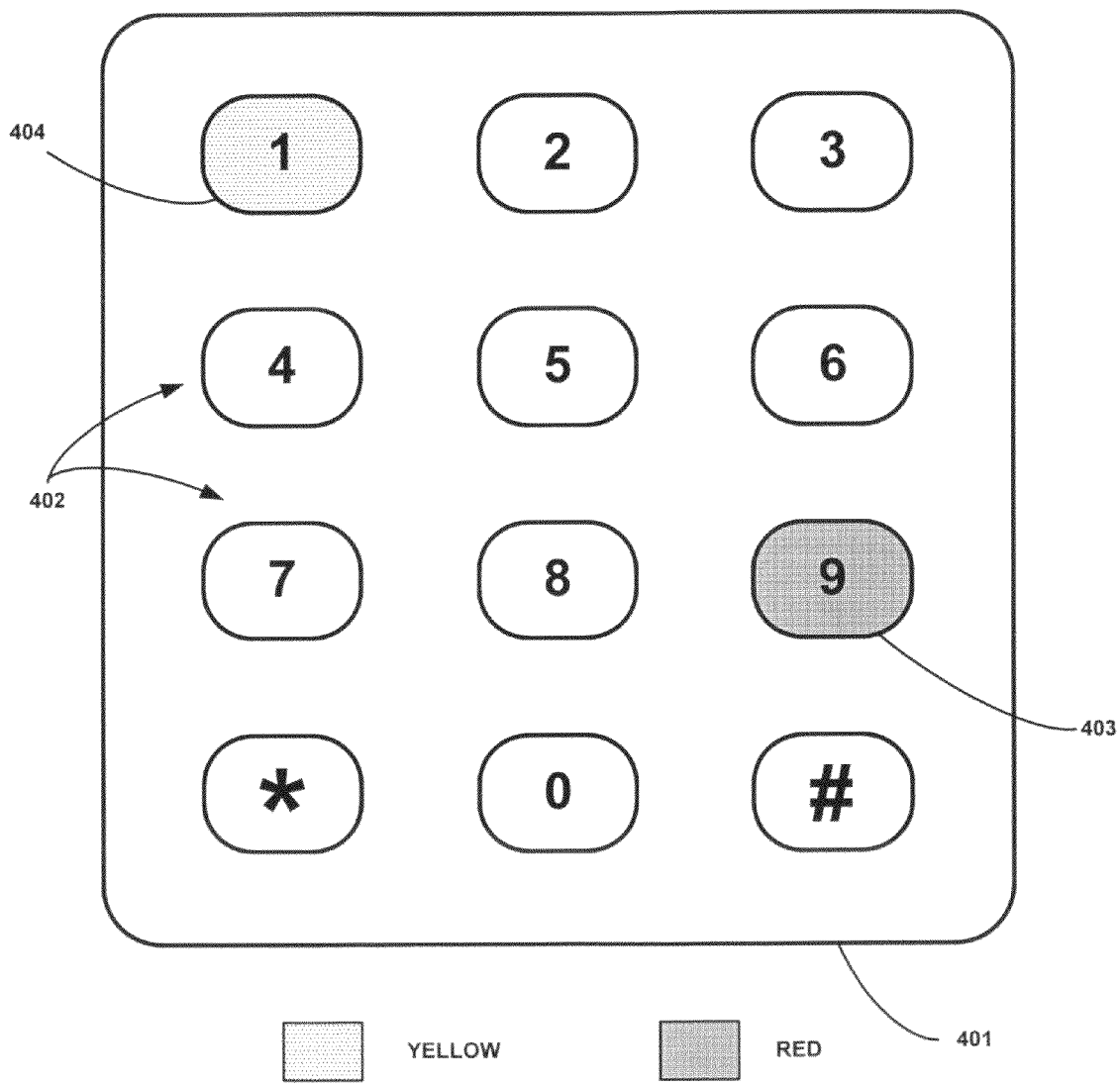
FIG. 4 depicts number buttons of a telephone according to one embodiment of the present method and system.

The term "telephone", as used herein, may refer to any device having a plurality of number buttons, such as, a wireline telephone, a wireless telephone, a satellite telephone, etc.

Telephones typically provide at least number input via a set of number buttons that may be marked with the digits 0-9. The number buttons may have other notations, such as letters, Braille symbols, etc. In fact the number buttons need not be necessarily marked with digits. The number buttons may have different shapes, such as square, rectangular, round, oval, etc.

It has been shown that a significantly greater number of children of four years of age and younger can recognize primary colors more readily than numbers. In other words, these children may not be able to dial 911, especially in an emergency, whereas they would be able to push color coded buttons.

Numerous other individuals may benefit from the present method and system. The individual that may be one of a child over the age of four, an elderly people, and a person with physical and/or mental disabilities. Thus, without knowledge or irrespective of the numbers on the buttons, an individual may push the number buttons in the sequence first predetermined color—second predetermined color—second predetermined color to dial an emergency telephone number. For example, an emergency number may be dialed by pushing red-yellow-yellow.

The present system may include instructions and/or tips on how to instruct the individual to dial the emergency number using "red-yellow-yellow". The instructions and/or tips may be in the form of a written document, an audio recording, or a video recording.

FIG. 1 depicts one embodiment of the present method and system for a telephone. In this embodiment a wall phone 101 has a plurality of number buttons 104. According to the present method and system the number 9 button 102 is marked with a first predetermined color, such as red, and the number 1 button 103 is marked with a second predetermined color, such as yellow. Other colors may be used such as blue, green, orange, etc. Also the other number buttons typically may be a third predetermined color, such as black, white, silver, blue, green, orange. However according to the present method and system the first, second and third predetermined colors are distinguishable from one another.

FIG. 2 depicts another embodiment of the present method and system for a telephone. In this embodiment a cell phone 201 has a plurality of number buttons 204. According to the present method and system the number 9 button 202 is marked with a first predetermined color, such as red, and the number 1 button 203 is marked with a second predetermined color, such as yellow.

FIG. 3 depicts a further embodiment of the present method and system for a telephone. In this embodiment a desk phone 301 has a plurality of number buttons 304. According to the present method and system the number 9 button 302 is marked with a first predetermined color, such as red, and the number 1 button 303 is marked with a second predetermined color, such as yellow.

FIG. 4 depicts, in general, the number buttons 402 of an input area 401 on a telephone according to one embodiment of the present method and system. According to the present method and system the number 9 button 403 is marked with a first predetermined color, such as red, and the number 1 button 404 is marked with a second predetermined color, such as yellow. The respective color may be due to the number button being molded out of that colored plastic, or the color may be due to a colored cap that is placed over the number button. Alternatively, the color may be painted onto the number button, or a colored sticker may be applied to the number button.

Figure 5:
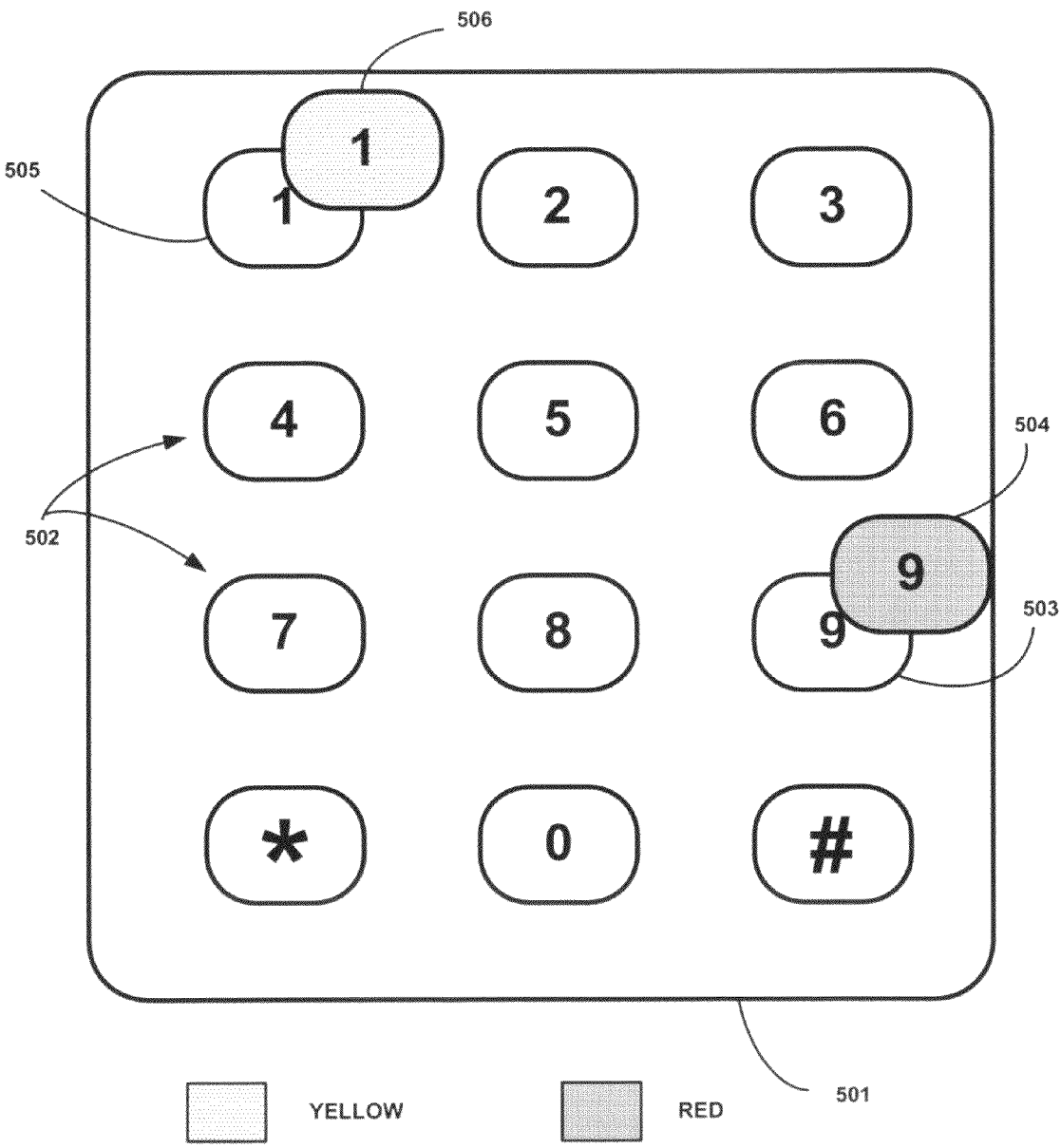
FIG. 5 depicts number buttons of a telephone according to another embodiment of the present method and system.

FIG. 5 depicts number buttons 502 of an input area 501 on a telephone according to another embodiment of the present method and system. In this embodiment it is shown that a red label 504 is applied to the number 9 button 503, and a yellow label 506 is applied to the number 1 button 505. A respective label may be applied to substantially an upper surface of the number button. The label may be in the form of a number of different types of labels. For example, the label may be an opaque colored pressure sensitive label, a translucent or transparent colored tinted pressure sensitive label, a dry transfer decal, etc. The translucent or transparent colored tinted pressure sensitive label may be especially useful on number buttons that light up, such as those on some cell phones.

Dry transfer is a term used to describe decals which can be applied without the use of water or other solvent. Sometimes they are called rub-ons or rubdowns due to the method of application. The decal itself is on a backing material such as paper or plastic sheeting. The backing is placed, decal side down, on the surface to transfer to, and then it is applied by rubbing with a stylus, ballpoint pen, pencil, etc.

A pressure sensitive label may consists of a pressure sensitive adhesive coated onto a backing material such as paper, plastic film, cloth, or metal foil. Some have a removable liner which protects the adhesive until the liner is removed. Some have layers of adhesives, primers, easy release materials, filaments, printing, etc. made for specific functions. Pressure sensitive labels will stick with application pressure without the need for solvent, heat, or water for activation.

Figure 6:
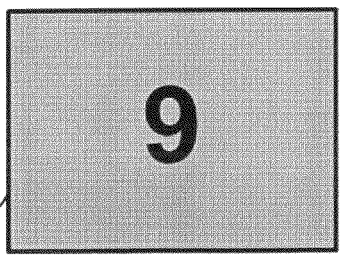
FIG. 6 depicts an embodiment of a label according to one embodiment of the present method and system for a telephone.

FIG. 6 depicts an embodiment of a label 601 according to one embodiment of the present method and system for a telephone. In this embodiment the label 601 is designed to fit a rectangular number button.

Figure 7:
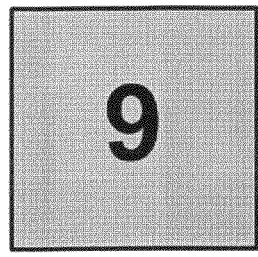
FIG. 7 depicts an embodiment of a label according to one embodiment of the present method and system for a telephone.

FIG. 7 depicts an embodiment of a label 701 according to one embodiment of the present method and system for a telephone. In this embodiment the label 701 is designed to fit a square number button.

Figure 8:
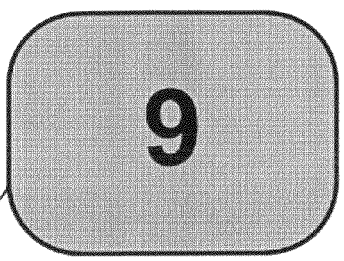
FIG. 8 depicts an embodiment of a label according to one embodiment of the present method and system for a telephone.

FIG. 8 depicts an embodiment of a label 801 according to one embodiment of the present method and system for a telephone. In this embodiment the label 801 is designed to fit a rectangular number button with rounded corners.

Figure 9:
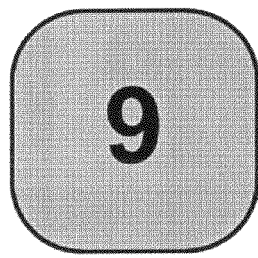
FIG. 9 depicts an embodiment of a label according to one embodiment of the present method and system for a telephone.

FIG. 9 depicts an embodiment of a label 901 according to one embodiment of the present method and system for a telephone. In this embodiment the label 901 is designed to fit a square number button with rounded corners.

Figure 10:
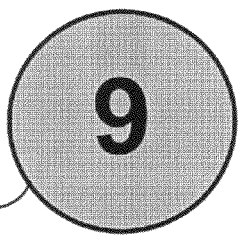
FIG. 10 depicts an embodiment of a label according to one embodiment of the present method and system for a telephone.

FIG. 10 depicts an embodiment of a label 1001 according to one embodiment of the present method and system for a telephone. In this embodiment the label 1001 is designed to fit a round number button.

Figure 11:
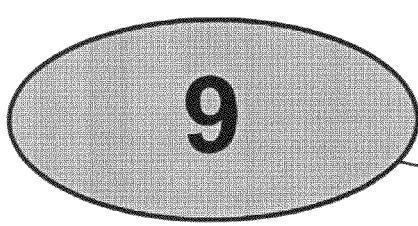
FIG. 11 depicts an embodiment of a label according to one embodiment of the present method and system for a telephone.

FIG. 11 depicts an embodiment of a label 1101 according to one embodiment of the present method and system for a telephone. In this embodiment the label 1101 is designed to fit an oval number button.

Figure 12:
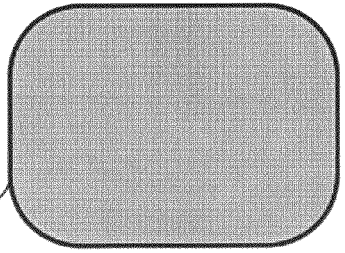
FIG. 12 depicts an embodiment of a label according to one embodiment of the present method and system for a telephone.

FIG. 12 depicts an embodiment of a label 1201 according to one embodiment of the present method and system for a telephone. In this embodiment the label 1201 is designed to fit a substantially rectangular number button. In this embodiment the label has only a solid red color.

Figure 13:
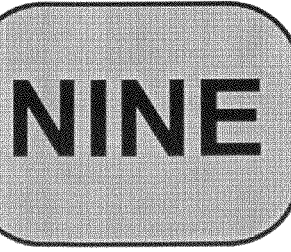
FIG. 13 depicts an embodiment of a label according to one embodiment of the present method and system for a telephone.

FIG. 13 depicts an embodiment of a label 1301 according to one embodiment of the present method and system for a telephone. In this embodiment the label 1301 is designed to fit a substantially rectangular number button having a notation using letters.

Figure 14:
FIG. 14 depicts an embodiment of a label according to one embodiment of the present method and system for a telephone.

FIG. 14 depicts an embodiment of a label 1401 according to one embodiment of the present method and system for a telephone. In this embodiment the label 1401 is designed to fit a substantially rectangular number button having a predetermined notation, such as in the Braille system.

Figure 15:
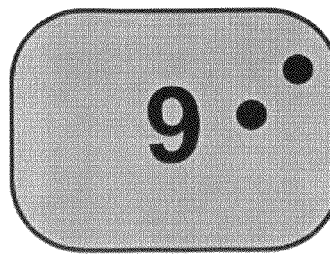
FIG. 15 depicts an embodiment of a label according to one embodiment of the present method and system for a telephone.

FIG. 15 depicts an embodiment of a label 1501 according to one embodiment of the present method and system for a telephone. In this embodiment the label 1501 is designed to fit a substantially rectangular number button having a number notation and a predetermined Braille notation.

Figure 16A:
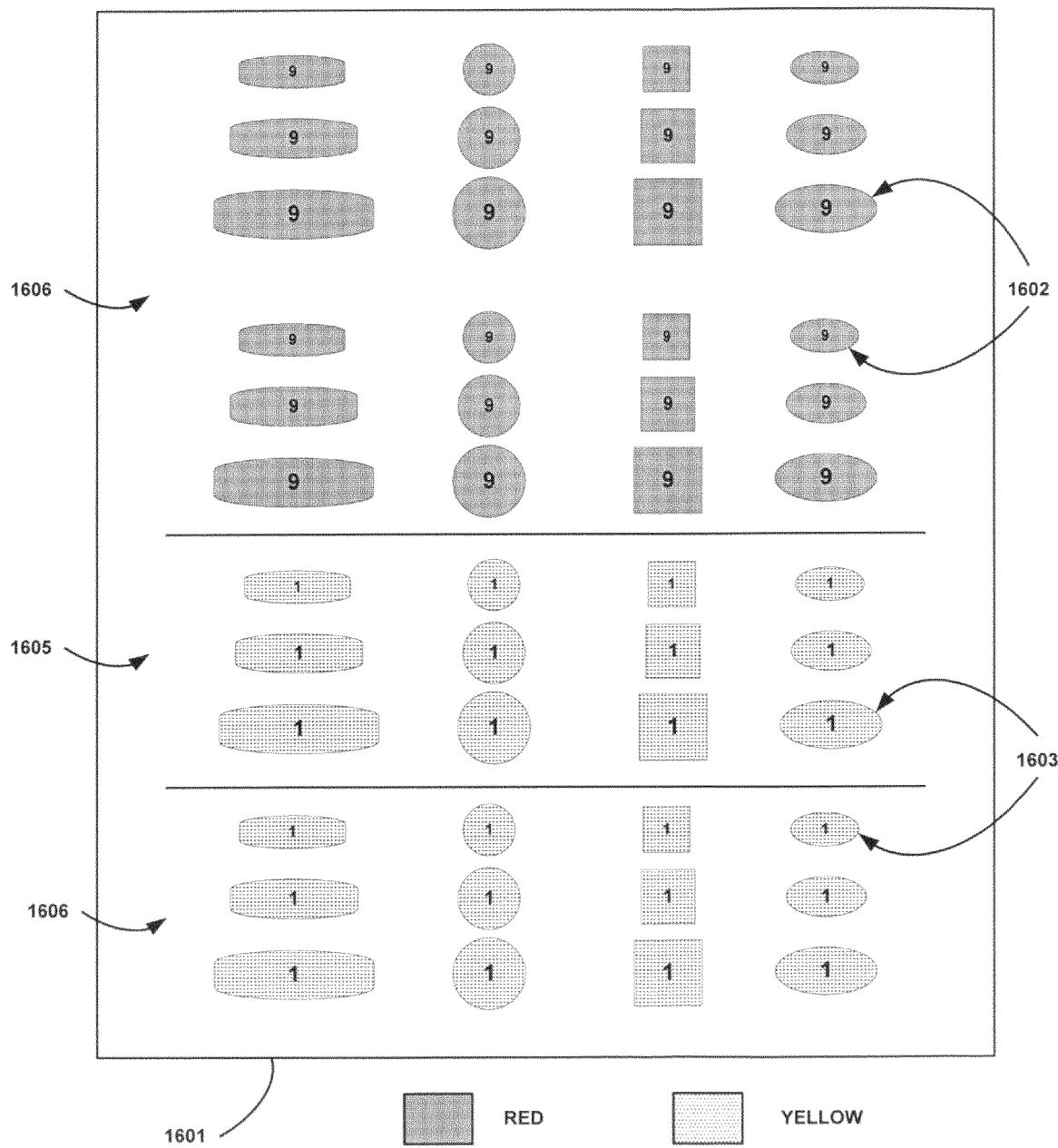
FIG. 16A depicts a sheet of labels according to one embodiment of the present method and system for a telephone.

FIG. 16A depicts a sheet 1601 of labels according to one embodiment of the present method and system for a telephone. In this embodiment the sheet may have a predetermined arrangement of a plurality of opaque labels, translucent labels, pressure sensitive label, dry transfer labels, etc. Since only one red label and one yellow label are required for use on a typical arrangement of number buttons on a telephone, the sheet 1601 is provided with an equal number of red labels 1602 and yellow labels 1603. However, in order to reinforce the concept of dialing red-yellow-yellow the labels are arranged in a first field 1604 of red labels 1602. The yellow labels 1603 may be arranged in two fields 1605, 1606. In the depicted embodiment the yellow labels 1604 may be equally split between the two fields 1605, 1606.

The sheet 1601 of labels may comprise a plurality of different shaped labels as shown in FIG. 16A. Alternatively, the sheet 1601 of labels may comprise a plurality of similar shaped labels, or any combination of different labels.

Figure 16B:
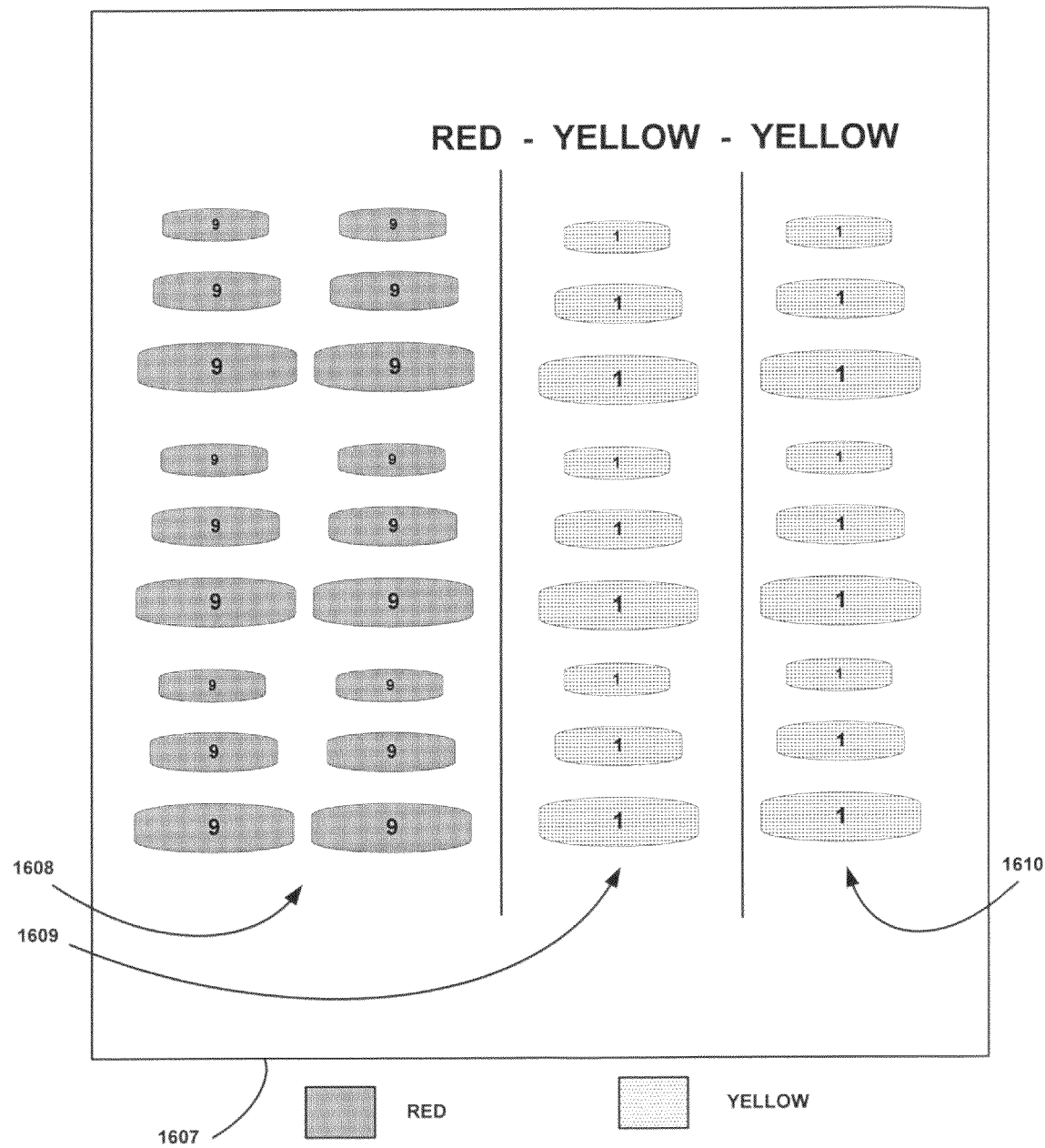
FIG. 16B depicts another sheet of labels according to one embodiment of the present method and system for a telephone.

FIG. 16B depicts another sheet of labels according to one embodiment of the present method and system for a telephone. This sheet 1607 is provided with an equal number of red labels and yellow labels in a first field 1608 of red labels, a second field of yellow labels 1609, and a third field of yellow labels 1610. The arrangement of the first, second, and third fields 1608, 1609, 1610 reinforces the concept of dialing red-yellow-yellow.

Figure 17:
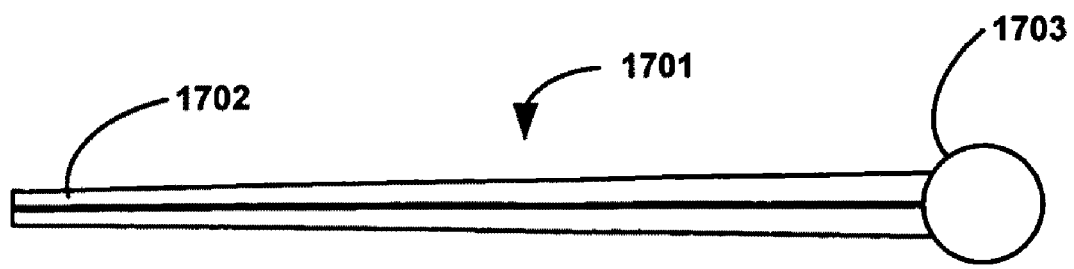
FIG. 17 depicts one embodiment of a tool for application of labels to number buttons according to one embodiment of the present method and system.

FIG. 17 depicts one embodiment of a tool 1701 for application of labels to number buttons according to one embodiment of the present method and system. In this embodiment the tool 1701 may be a dual function tool having a first end 1702 configured in a tweezers type configuration for removing a label from backing on a sheet of labels. The tool 1701 may also have a second end 1703 configured substantially rounded for rubbing down the label on an upper surface of a number button.

Figure 18:
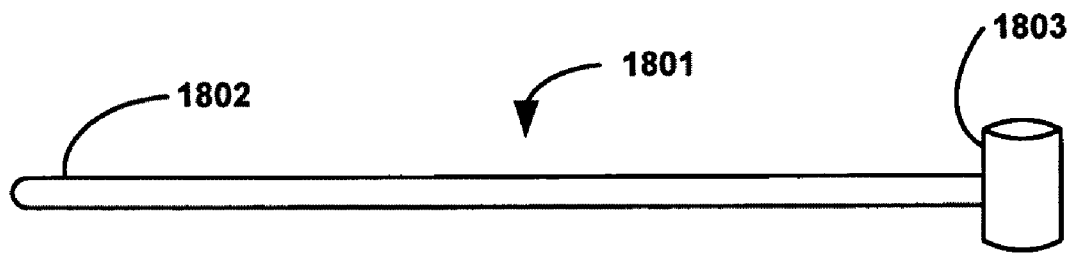
FIG. 18 depicts another embodiment of a tool for application of labels to number buttons according to one embodiment of the present method and system.

FIG. 18 depicts another embodiment of a tool for application of labels to number buttons according to one embodiment of the present method and system. In this embodiment the tool 1801 may be a dual function tool having a first end 1802 configured for removing a label from backing on a sheet of labels. The first end 1802 may have different shapes, such as substantially pointed as, for example, a toothpick, shoveled shaped, etc. The tool 1801 may also have a second end 1803 cylindrically configured for rubbing down the label on an upper surface of a number button that has corners, such as a substantially rectangular upper surface of a number button.

Figure 19:
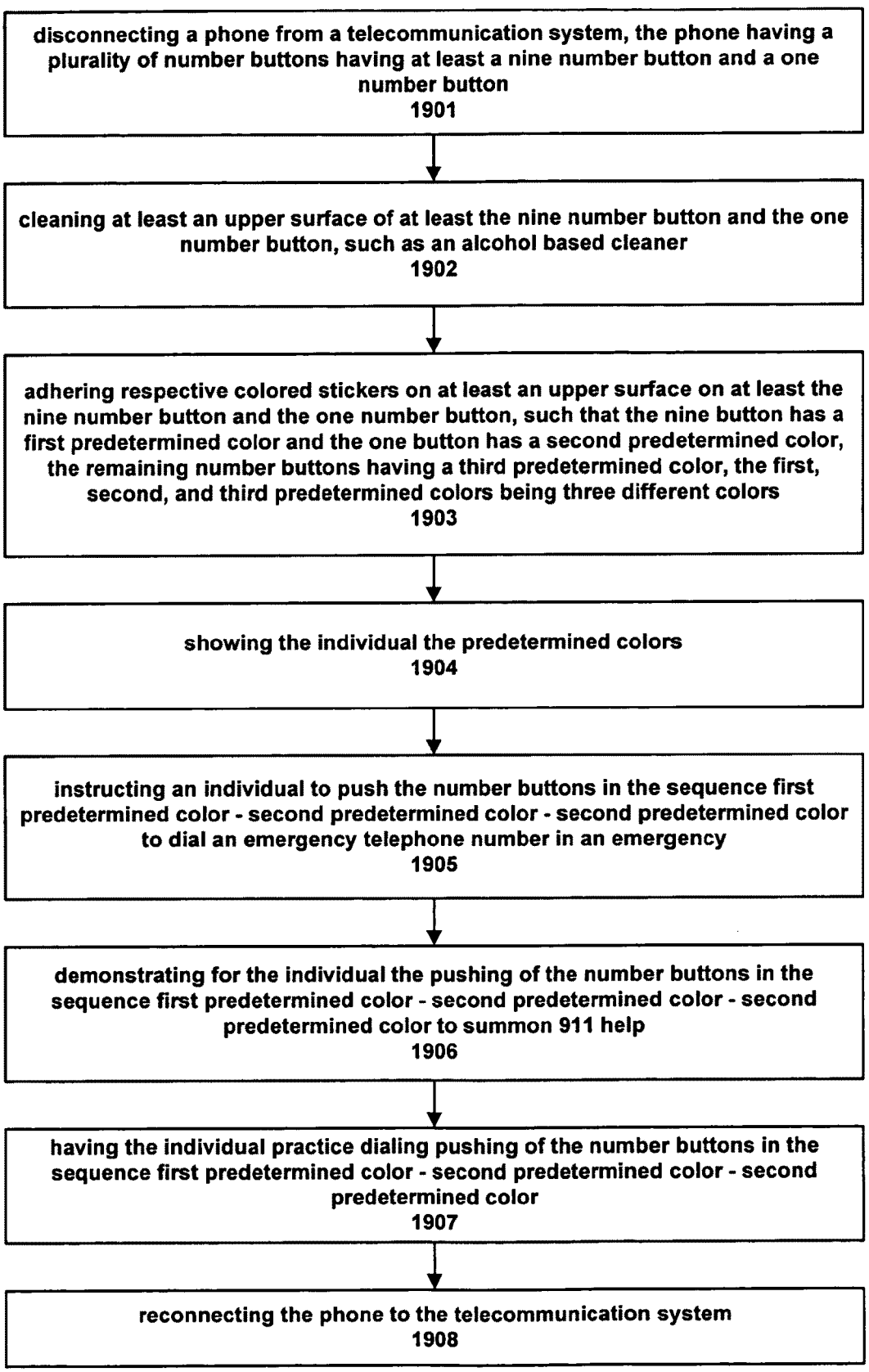
FIG. 19 depicts one embodiment of a method according to one embodiment of the present method and system.

FIG. 19 depicts one embodiment of a method according to one embodiment of the present method and system. This embodiment of the present method may comprise: disconnecting a phone from a telecommunication system, the phone having a plurality of number buttons having at least a nine number button and a one number button (step 1901); cleaning at least an upper surface of at least the nine number button and the one number button, such as an alcohol based cleaner (step 1902); adhering respective colored stickers on at least an upper surface on at least the nine number button and the one number button, such that the nine button has a first predetermined color and the one button has a second predetermined color, the remaining number buttons having a third predetermined color, the first, second, and third predetermined colors being three different colors (step 1903); showing the individual the predetermined colors (step 1904); instructing an individual to push the number buttons in the sequence first predetermined color—second predetermined color—second predetermined color to dial an emergency telephone number in an emergency (step 1905); demonstrating for the individual the pushing of the number buttons in the sequence first predetermined color—second predetermined color—second predetermined color to summon 911 help (step 1906); having the individual practice dialing pushing of the number buttons in the sequence first predetermined color—second predetermined color—second predetermined color (step 1907); and reconnecting the phone to the telecommunication system (step 1908).

The individual may be one of a child under the age of four, an elderly people, and a person with physical and/or mental disabilities. Thus, without knowledge or irrespective of the numbers on the buttons, an individual may push the number buttons in the sequence first predetermined color—second predetermined color—second predetermined color to dial an emergency telephone number. That is, an emergency number may be dialed by pushing red-yellow-yellow.

FIGS. 20-22 depict the concept that according to the present method and system the number buttons may be pushed in the sequence first predetermined color—second predetermined color—second predetermined color without regard to any orientation of the telephone, without regard to any orientation of the number buttons on the telephone, and without regard to any notations on the number buttons.

FIG. 20 depicts a phone 2002 has a number 9 button 2004 marked with a first predetermined color, such as red, and number 1 button 2003 marked with a second predetermined color, such as yellow. In FIG. 20 an individual is viewing the phone 2002 from one side as indicated by the direction of view arrow 2001.

In FIG. 21 the individual is viewing the phone 2002 from the other side as indicated by the direction of view arrow 2005.

In FIG. 22 the individual is viewing the phone 2002 from an angle as indicated by the direction of view arrow 2006.

No matter which direction of view 2001, 2005, 2006 the individual has of the phone 2002 and the number buttons, the individual is able to quickly identify the red button 2004 and the yellow button 2003. The individual may now quickly and accurately dial 911 using "red-yellow-yellow". The "red-yellow-yellow" actually is beneficial to any individual of any age.

A number of known telephones must be turned on or activated by pushing a predetermined button on the phone. Many cell phones fall into this category. The present method and system may be extended to include activation of the phone by using a special predetermined color, such as blue, which is different from the first and second predetermined colors that may be red and yellow. The individual may then be instructed to dial for an emergency, blue-red-yellow-yellow.

Also, cell phones typically require the pushing of a send button after a number is dialed. The present method and system may be extended to include providing a unique color for the send button, for example, green. The individual may then be instructed to dial for an emergency, red-yellow-yellow-green.

The red-yellow-yellow dialing may be further used for system that uses other methods of dialing than pushing number buttons. For example, and individual may verbally call out "red-yellow-yellow" for a voice-activated phone, such as those installed in vehicles. Also, other service numbers may be colored coded, such as 411. Furthermore, the service number may consist of one, two, three, or more digits that are color-coded.

It is to be understood that notations on labels and voice activated commands may be in languages other than English according to the present method and system.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A system, comprising:
    a telephone having a plurality of number buttons;
    the plurality of number buttons having at least a nine button and a one button;
    the nine number button having a first predetermined color;
    the one number button having a second predetermined color;
    means for coloring a respective upper surface of the nine button such that it has at least in part the first predetermined color, and for coloring a respective upper surface of the one button such that it has at least in part the second predetermined color;
    the two through eight and zero number buttons having a third predetermined color;
    the first, second, and third predetermined colors being three different colors; and
    instructions that recite dialing first predetermined color—second predetermined color—second predetermined color.

2. The system according to claim 1, wherein the means for coloring the nine and one buttons are opaque colored pressure sensitive labels having respectively the first and second colors, are at least one of transparent and translucent colored pressure sensitive labels having respectively the first and second colors, are dry transfer decals having respectively the first and second colors, are paints having respectively the first and second colors.

3. The system according to claim 2, wherein the system further comprises a tool for adhering the colored pressure sensitive labels respectively to at least the nine button and the one button.

4. The system according to claim 3, wherein the tool is a dual function tool having a first structured for holding and applying a pressure sensitive label to a respective button, and a second structure to applying pressure to the label to secure the label to at least an upper surface of the respective button.

5. The system according to claim 1, wherein the at least nine button and one button are at least one of formed from a colored material or covered with a colored material.

6. The system according to claim 1, wherein the first predetermined color is red, and wherein the second predetermined color is yellow.

7. The system according to claim 6, wherein a 911 emergency telephone number is dialable by pushing the nine and one buttons in the order red-yellow-yellow.

8. The system according to claim 7, wherein the nine button having the first predetermined color further has a symbol representative of "9" on the first predetermined color, and wherein the one button having the second predetermined color further has a symbol representative of "1" on the first predetermined color.

9. A method, comprising:
    applying, for a telephone having a plurality of number buttons having at least a nine button and a one button, a first predetermined color to a respective upper surface of the nine button and a second predetermined color to a respective upper surface of the one button, the remaining number buttons having a third predetermined color, the first, second, and third predetermined colors being three different colors; and
    pushing the number buttons in a sequence first predetermined color—second predetermined color—second predetermined color to dial an emergency telephone number.

10. The method according to claim 9, wherein the method further comprises instructing an individual to push the number buttons in the sequence first predetermined color—second predetermined color—second predetermined color to dial an emergency telephone number.

11. The method according to claim 10, wherein the individual is one of a child, an elderly person, and a person with physical and/or mental disabilities.

12. The method according to claim 10, wherein the individual is a child under the age of four.

13. The method according to claim 9, wherein the buttons are pushed in the sequence first predetermined color—second predetermined color—second predetermined color without regard to an orientation of the plurality of number buttons on the telephone.

14. The method according to claim 9, wherein the buttons are pushed in the sequence first predetermined color—second predetermined color—second predetermined color without regard to at least one of any orientation of the telephone, any orientation of the number buttons on the telephone, and any notations on the number buttons.

15. A method, comprising:
- disconnecting a phone from a telecommunication system, the phone having a plurality of number buttons having at least a nine number button and a one number button;
- cleaning at least an upper surface of at least the nine number button and the one number button, such as an alcohol based cleaner;
- adhering respective colored stickers on at least an upper surface on at least the nine number button and the one number button, such that the nine button has a first predetermined color and the one button has a second predetermined color, the remaining number buttons having a third predetermined color, the first, second, and third predetermined colors being three different colors;
- showing an individual the predetermined colors;
- instructing the individual to push the number buttons in the sequence first predetermined color—second predetermined color—second predetermined color to dial an emergency telephone number in an emergency;
- demonstrating for the individual the pushing of the number buttons in the sequence first predetermined color—second predetermined color—second predetermined color to summon 911 help;
- having the individual practice dialing pushing of the number buttons in the sequence first predetermined color—second predetermined color—second predetermined color; and
- reconnecting the phone to the telecommunication system.

16. The method according to claim 15, wherein the individual is one of a child under the age of four, an elderly people, and a person with physical and/or mental disabilities.

17. The method according to claim 15, wherein the colored stickers are opaque colored pressure sensitive labels having respectively the first and second predetermined colors, are at least one of transparent and translucent colored pressure sensitive labels having respectively the first and second predetermined colors, are dry transfer decals having respectively the first and second predetermined colors, are paints having respectively the first and second predetermined colors.

18. The method according to claim 15, wherein the first predetermined color is red, and wherein the second predetermined color is yellow.

19. The method according to claim 15, wherein the number buttons are pushed in the sequence first predetermined color—second predetermined color—second predetermined color without regard to any orientation of the telephone, without regard to any orientation of the number buttons on the telephone, and without regard to any notations on the number buttons.

* * * * *